(12) United States Patent
Kawamoto

(10) Patent No.: US 11,102,407 B2
(45) Date of Patent: Aug. 24, 2021

(54) POWERED DEVICE AND METHOD OF CHANGING POWER SUPPLY THEREFOR

(71) Applicant: CANON KABUSHIKI KAISHA, Tokyo (JP)

(72) Inventor: Tomohiro Kawamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 16/560,850

(22) Filed: Sep. 4, 2019

(65) Prior Publication Data

US 2020/0084378 A1 Mar. 12, 2020

(30) Foreign Application Priority Data

Sep. 7, 2018 (JP) .............................. JP2018-167833

(51) Int. Cl.
*H04N 5/232* (2006.01)
*G06F 1/26* (2006.01)

(52) U.S. Cl.
CPC ......... *H04N 5/23241* (2013.01); *G06F 1/263* (2013.01)

(58) Field of Classification Search
CPC . H04N 5/23241; H04N 5/23206; G06F 1/263
See application file for complete search history.

(56) References Cited

U.S. PATENT DOCUMENTS

| 2004/0239782 | A1* | 12/2004 | Equitz ................... | H04N 5/367 348/246 |
| 2010/0031066 | A1* | 2/2010 | Geiger ................... | H04L 12/10 713/300 |
| 2017/0026188 | A1* | 1/2017 | Herzel .................. | H04N 5/765 |
| 2017/0094170 | A1* | 3/2017 | Shih ...................... | H04N 5/2256 |
| 2019/0113960 | A1* | 4/2019 | El Kolli ................ | G06F 1/3203 |
| 2019/0129485 | A1* | 5/2019 | Amano .................. | G06F 1/263 |
| 2019/0148937 | A1* | 5/2019 | Kawamoto ............. | H02J 1/102 307/80 |
| 2019/0250683 | A1* | 8/2019 | Huang ................... | G06F 1/266 |

FOREIGN PATENT DOCUMENTS

JP 2012-95502 A 5/2012

\* cited by examiner

*Primary Examiner* — Nhan T Tran
(74) *Attorney, Agent, or Firm* — Canon U.S.A., Inc. I.P. Division

(57) ABSTRACT

A powered device receives power from at least one of a first power supply and a second power supply having a voltage higher than a voltage of the first power supply. The powered device includes a first load unit, a second load unit electrically separated from the first load unit, and a changing unit configured to supply power from the first power supply to the first load unit and the second load unit in a case where the first power supply is connected to the powered device and the second power supply is not connected to the powered device, and supply power from the second power supply to the first load unit and from the first power supply to the second load unit in a case where the first power supply and the second power supply are connected to the powered device.

10 Claims, 8 Drawing Sheets

FIG.3

| GENERAL-PURPOSE POWER SUPPLY | PSE POWER SUPPLY | STATE OF SWITCH UNIT |
|---|---|---|
| CONNECTED | CONNECTED | OPEN |
| CONNECTED | UNCONNECTED | OPEN |
| UNCONNECTED | CONNECTED | SHORT CIRCUIT |
| UNCONNECTED | UNCONNECTED | INDEFINITE |

POWERED DEVICE AND METHOD OF CHANGING POWER SUPPLY THEREFOR

BACKGROUND

Field

The present disclosure relates to a powered device that can receive power from a plurality of power supplies and a method of changing power supply therefor.

Description of the Related Art

In recent years, a technique for transmitting and receiving signals and supplying power using an Ethernet® cable has been known. This is a technique in conformity with the Institute of Electrical and Electronics Engineers (IEEE) 802.3at standard defined as an international standard, and is called Power over Ethernet® (PoE). In the PoE, power sourcing equipment (PSE), which is a power supply device, supplies power to a powered device (PD).

Further, a PD that can receive power from a plurality of power supplies having different voltages has been known. For example, there has been known a PD that can selectively receive power either from a power supply that supports the PoE in conformity with the IEEE 802.3at standard (PSE) or from a general-purpose power supply such as an alternating current (AC) adapter. Among such PDs, there is a device that receives power from a second power supply in a state where a first power supply (e.g., a general-purpose power supply) and the second power supply (e.g., PSE) are concurrently connected (e.g., Japanese Patent Application Laid-Open No. 2012-95502). Such a PD changes to a state where the PD operates with the first power supply if the second power supply is disconnected in the state where the first power supply and the second power supply are concurrently connected. If the second power supply is connected in a state where only the first power supply is connected, the PD changes to a state where the PD operates with the second power supply.

However, in the technique discussed in Japanese Patent Application Laid-Open No. 2012-95502, if the PSE is connected to the PD in a state where only the general-purpose power supply is connected to the PD and power of a predetermined value (12.95 W) or more is supplied from the general-purpose power supply, power supply from the PSE to the PD can stop.

More specifically, all functions of the PD are already in operation with the power from the general-purpose power supply when the PSE is connected to the PD, but due to a change from the general-purpose power supply to the PSE power supply, an electric current of a limit value (400 mA) or more flows from the PSE to the PD immediately after the change. At this moment, a function of preventing an overcurrent (electric current exceeding the limit value) operates in the PSE. Thus, there is a case where the power supply from the PSE to the PD stops. For example, in a case where the PD is a monitoring camera, the monitoring camera is reset if the power supply from the PSE to the monitoring camera stops, so that monitoring using the monitoring camera is not performed until a reboot.

Techniques for improving stability of operation involving a change in power supply for a PD that can receive power from a plurality of power supplies are needed, for example.

SUMMARY

According to various embodiments of the present disclosure, a powered device receives power from at least one of a first power supply and a second power supply having a voltage higher than a voltage of the first power supply. The powered device includes a first load unit, a second load unit electrically separated from the first load unit, and a changing unit configured to supply power from the first power supply to the first load unit and the second load unit in a case where the first power supply is connected to the powered device and the second power supply is not connected to the powered device, and supply power from the second power supply to the first load unit and from the first power supply to the second load unit in a case where the first power supply and the second power supply are connected to the powered device.

Further features will become apparent from the following description of exemplary embodiments with reference to the attached drawings.

BRIEF DESCRIPTION OF THE DRAWINGS

FIG. 3 is a table illustrating operation of a switch unit of the powered device in FIG. 2 according to one embodiment.

DESCRIPTION OF THE EMBODIMENTS

Exemplary embodiments of the present disclosure will be described in detail below with reference to the attached drawings. The exemplary embodiments to be described below are examples of implementation of the present disclosure, and may be modified or altered as appropriate depending on a configuration and various conditions of an apparatus or a system to which the present invention is applied, and the present invention is not limited to the following exemplary embodiments.

(Summary of System Including Powered Device)

Figure 1:
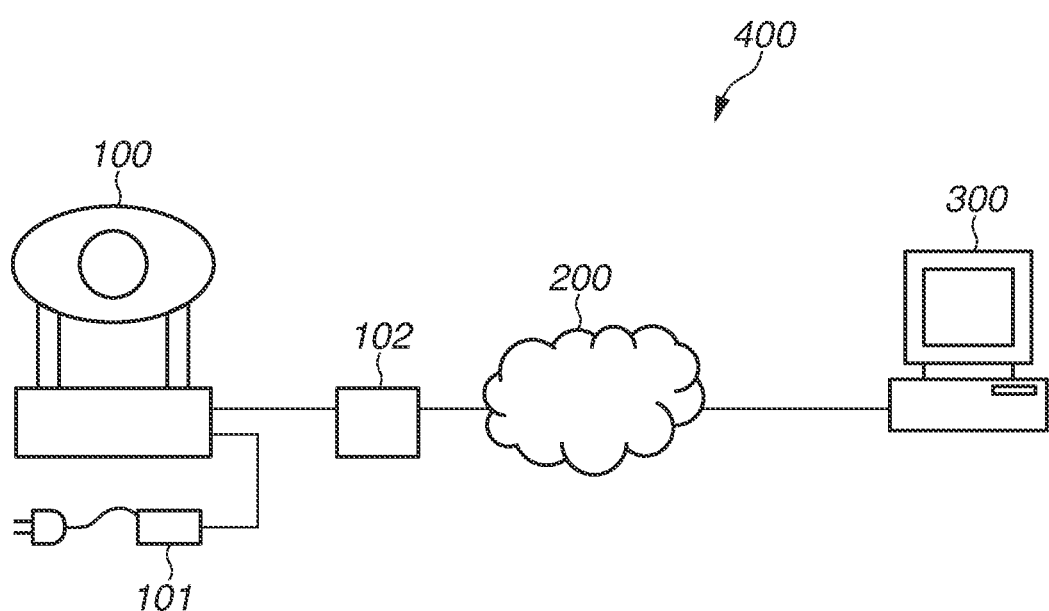
FIG. 1 is a diagram schematically illustrating a system including a powered device according to an exemplary embodiment of the present disclosure.

FIG. 1 schematically illustrates a system 400 including a powered device 100 according to an exemplary embodiment of the present disclosure, a first power supply (general-purpose power supply) 101, a second power supply (power sourcing equipment (PSE) power supply) 102, a network 200, and a client apparatus 300. The powered device 100 according to the present exemplary embodiment is a monitoring camera (network camera), and the system 400 is a monitoring camera system.

The powered device 100 includes a network server function. Further, the powered device 100 serving as the network camera includes an image capturing lens, and has a function of photoelectrically converting light that is condensed using the image capturing lens. Furthermore, the powered device 100 includes a focusing function, a zooming function, and an infrared (IR) cutoff filter switching function.

The first power supply 101 is, for example, an alternating current/direct current (AC/DC) adapter. The second power supply 102 is a power supply that performs power supply in conformity with the Institute of Electrical and Electronics Engineers (IEEE) 802.3at standard.

The second power supply 102 is, for example, a Power over Ethernet (PoE) hub, and performs predetermined power supply and transmission of a video signal from the powered device 100 and a control command signal for operation such as zooming to the powered device 100 via the network 200. The network 200 is, for example, a local area network (LAN). The client apparatus 300 is, for example, a personal computer with a monitor (display unit) for monitoring. The client apparatus 300 can transmit a video control command signal and a control command signal to the powered device 100 via the network 200. Further, the client apparatus 300 can receive a picked-up image from the powered device 100 and display the received image on the display unit. The client apparatus 300 may be a network server or an apparatus such as a tablet computer, a smartphone, or a mobile phone.

(Powered Device and Power Supply)

Figure 2:
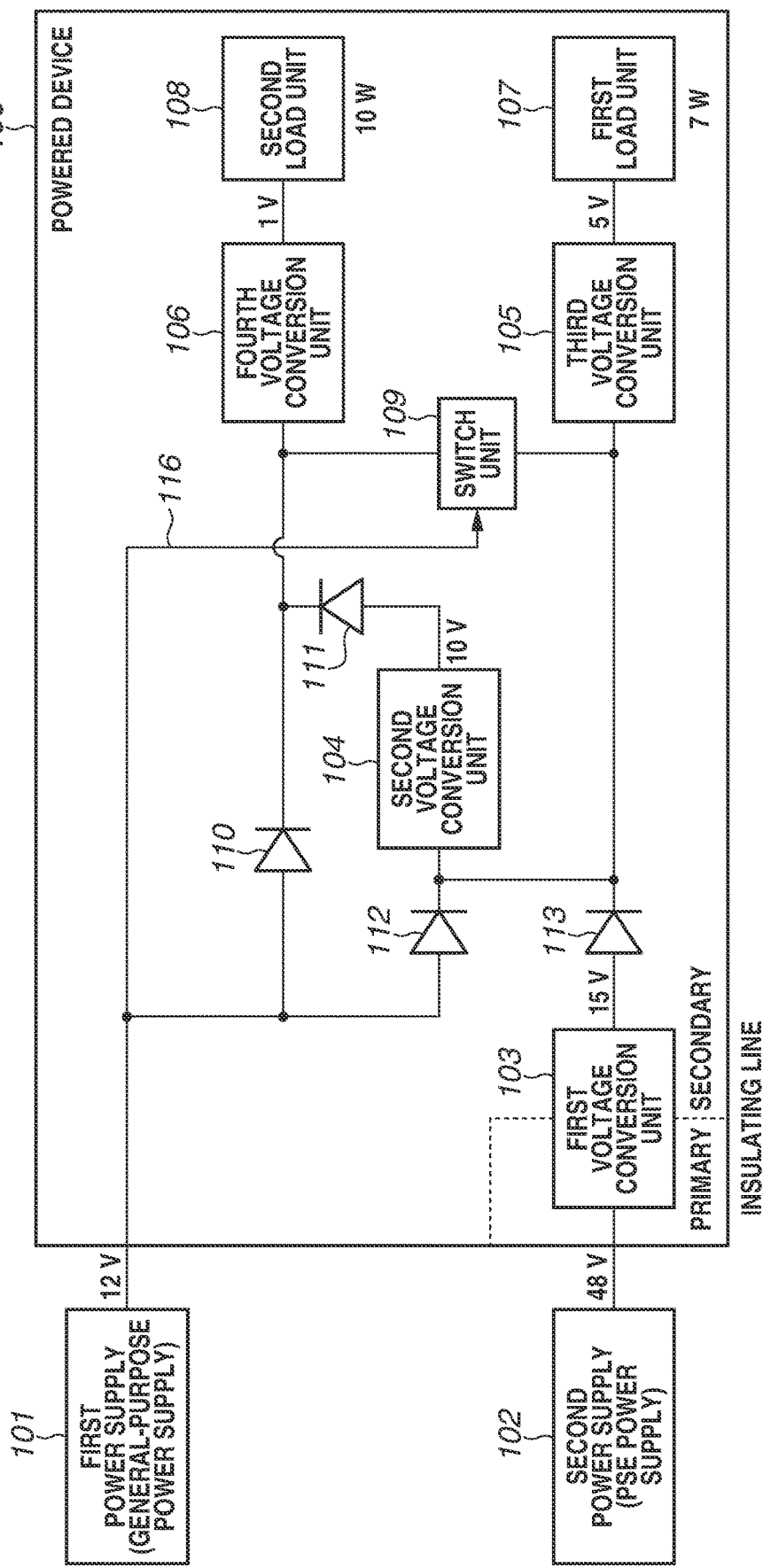
FIG. 2 is a diagram illustrating a configuration of the powered device in FIG. 1 according to one embodiment.

FIG. 2 is a diagram illustrating the powered device 100 according to the exemplary embodiment of the present disclosure, the first power supply 101, and the second power supply 102. The powered device 100 can be connected to the first power supply 101 and the second power supply 102, and can receive power from at least one of the first power supply 101 and the second power supply 102.

In the present exemplary embodiment, the second power supply 102 has a multiport to which connectors of a plurality of Ethernet® cables can be connected. The second power supply 102 is a switching hub that can perform communication based on the Transmission Control Protocol/Internet Protocol (TCP/IP) and power supply compliant with the PoE standard. The communication that can be performed by the second power supply 102 is not limited to the TCP/IP.

(Selection of Power Feeding Type)

Here, the IEEE 802.3at standard that the second power supply (PSE power supply) 102 can support will be described. According to the IEEE 802.3at standard, a powered device (PD) can select maximum power to be supplied from PSE to the PD in PoE. More specifically, the PD can select one of two types (Type 1 and Type 2) as a power feeding type. If the PD selects Type 1 (Type 1 standard) as the power feeding type, the PD can receive power of up to 12.95 W from the PSE. If the PD selects Type 2 (Type 2 standard) as the power feeding type, the PD can receive power of up to 25.5 W from the PSE. Two-stage class detection of a physical layer or the Link Layer Discovery Protocol (LLDP) of a data link layer is used to select either Type 1 or Type 2. Processing for selecting either Type 1 or Type 2 using the two-stage class detection of the physical layer or the LLDP of the data link layer will be hereinafter referred to as a "negotiation".

If the PD is connected, the PSE executes the negotiation in conformity with the IEEE 802.3at standard, and then starts power feeding to the PD. The PSE has a function of stopping power feeding until the negotiation ends to prevent an excessive electric current from flowing through the PD in a case where the PD selects Type 2.

In a case where the PD selects the power feeding type using the two-stage class detection of the physical layer, an upper limit of an electric current that flows from the PSE to the PD is defined to be, for example, 400 mA before completion of the negotiation. After the negotiation is completed, the PD can receive power of up to 25.5 W (electric current of up to 684 mA).

Similarly, in a case where the PD selects Type 2 as the power feeding type using the LLDP, the upper limit of the electric current that flows from the PSE to the PD is defined to be 400 mA before completion of data communication based on the LLDP. After the negotiation based on the LLDP is completed, the PD can receive power of up to 25.5 W (electric current of up to 684 mA).

The powered device 100 executes the above-described negotiation. Immediately after power-on, the powered device 100 performs the negotiation while performing processing such as initialization of the powered device 100. Thus, not all functions of the powered device 100 are operated immediately after the power-on, and performing the negotiation within a limited current value is required.

(Configuration of Powered Device)

As illustrated in FIG. 2, the powered device 100 is configured so that a primary power supply system and a secondary power supply system are insulated from each other. The primary power supply system includes the second power supply (hereinafter referred to as the "PSE power supply") 102, and the secondary power supply system includes the first power supply (hereinafter referred to as the "general-purpose power supply") 101. Each of the general-purpose power supply 101 and the PSE power supply 102 is in a power-supply enabled state when being inserted into an outlet such as a household wall outlet. Each of the general-purpose power supply 101 and the PSE power supply 102 is in a power-supply disabled state when being disconnected from a power source such as the outlet. In the present exemplary embodiment, power that can be supplied from the general-purpose power supply 101 is 25.5 W, and power that can be supplied from the PSE power supply 102 is also 25.5 W.

The powered device 100 includes a first voltage conversion unit 103, a second voltage conversion unit 104, a third voltage conversion unit 105, a fourth voltage conversion unit 106, a first load unit 107, a second load unit 108, and a switch unit 109. The powered device 100 further includes backflow prevention diodes 110, 111, 112, and 113.

The first voltage conversion unit 103 is connected to an output unit of the PSE power supply 102, and receives power (voltage) from the PSE power supply 102. The first voltage conversion unit 103 converts the voltage from the PSE power supply 102. The voltage after conversion (15 V in the present exemplary embodiment) is set to be higher than a voltage (12 V) of the first power supply (general-purpose power supply) 101.

The second voltage conversion unit 104 is connected to an output unit of each of the general-purpose power supply 101 and the first voltage conversion unit 103, and can receive power (voltage) from each of the general-purpose power supply 101 and the first voltage conversion unit 103. The second voltage conversion unit 104 converts the output voltage from the general-purpose power supply 101 or the first voltage conversion unit 103. The voltage after conversion (10 V in the present exemplary embodiment) is set to be lower than the voltage (12 V) of the first power supply (general-purpose power supply) 101.

The third voltage conversion unit 105 is connected to the output unit of each of the general-purpose power supply 101 and the first voltage conversion unit 103, and can receive the power (voltage) from each of the general-purpose power supply 101 and the first voltage conversion unit 103. The third voltage conversion unit 105 converts the output voltage of the general-purpose power supply 101 or the first voltage conversion unit 103. A voltage after conversion (5 V in the present exemplary embodiment) is set to be higher than or equal to a voltage necessary for the first load unit 107 and lower than the voltage (12 V) of the first power supply (general-purpose power supply) 101.

The fourth voltage conversion unit 106 is connected to the output unit of each of the general-purpose power supply 101 and the first voltage conversion unit 103 and an output unit of the second voltage conversion unit 104. The fourth voltage conversion unit 106 converts the output voltage from the general-purpose power supply 101, the first voltage conversion unit 103, or the second voltage conversion unit 104. A voltage after conversion (1 V in the present exemplary embodiment) is set to be higher than or equal to a voltage necessary for the second load unit 108 and lower than 12 V.

The first load unit 107 includes an image sensor and a lens motor. The first load unit 107 is connected to an output unit of the third voltage conversion unit 105 and receives power from the third voltage conversion unit 105.

The second load unit 108 includes an image processing integrated circuit (IC). The second load unit 108 is connected to an output unit of the fourth voltage conversion unit 106 and receives power from the fourth voltage conversion unit 106. The second load unit 108 is separated from the first load unit 107.

In the present exemplary embodiment, power consumption of the first load unit 107 is less than or equal to capacity of the general-purpose power supply 101, and power consumption of the second load unit 108 is less than or equal to capacity of the PSE power supply 102. Which component specifically belongs to the first load unit 107 and which component specifically belongs to the second load unit 108, among the components of the powered device 100, are determined as appropriate depending on capacity of each of the components of the powered device 100.

The switch unit 109 is connected to an input unit of each of the third voltage conversion unit 105 and the fourth voltage conversion unit 106. The switch unit 109 includes a switch element (e.g., a field effect transistor (FET)).

In the present exemplary embodiment, the output voltage from the PSE power supply 102 is 48 V, and the output voltage from the general-purpose power supply 101 is 12 V. The output voltage from the first voltage conversion unit 103 is 15 V, the output voltage from the second voltage conversion unit 104 is 10 V, the output voltage from the third voltage conversion unit 105 is 5 V, and the output voltage from the fourth voltage conversion unit 106 is 1 V. Maximum electric power consumption of the first load unit 107 (maximum electric power necessary to drive the first load unit) is 7 W, and maximum electric power consumption of the second load unit 108 is 10 W.

(Operation of Switch Unit)

Operation of the switch unit 109 will be described with reference to FIG. 3.

In a case where the general-purpose power supply 101 is connected to the powered device 100, the switch unit 109 is in an open state irrespective of whether the PSE power supply 102 is connected. When the general-purpose power supply 101 is connected to the powered device 100, the voltage of 12 V is supplied to the switch unit 109 as indicated with an arrow 116 in FIG. 2, and the switch unit 109 enters the open state. In a case where the switch unit 109 has an FET, the FET is turned off if the voltage of 12 V is applied.

In a case where the general-purpose power supply 101 is not connected to the powered device 100 and only the PSE power supply 102 is connected to the powered device 100, the switch unit 109 is in a short circuit state. In a case where neither the PSE power supply 102 nor the general-purpose power supply 101 is connected to the powered device 100, the switch unit 109 is in an indefinite state.

(Power Supply Connection and State Transition of Load Unit Power Feeding)

Figure 4:
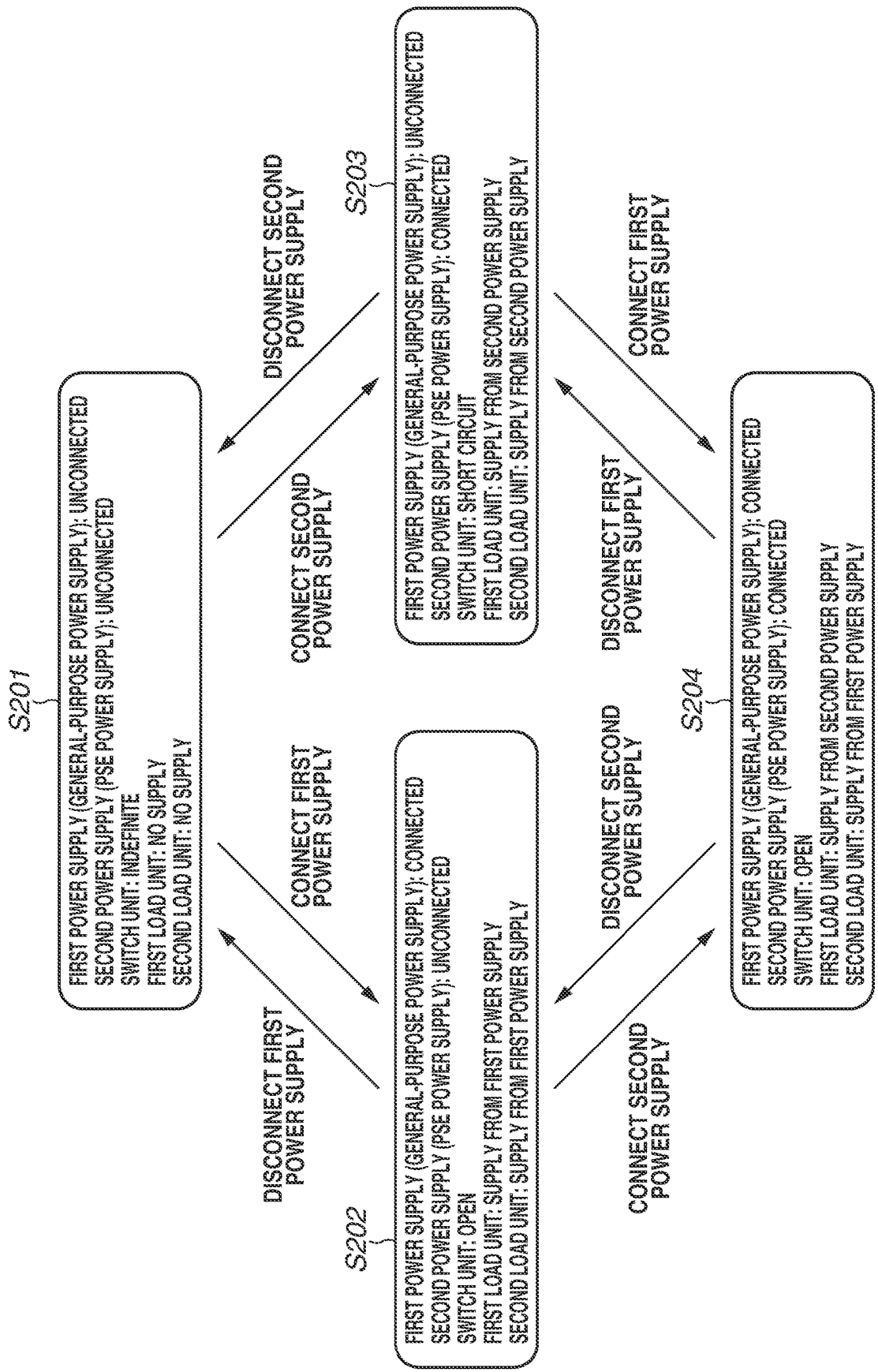
FIG. 4 is a diagram illustrating a state transition corresponding to a power-supply connection state according to one embodiment.

FIG. 4 is a state transition diagram illustrating connection or disconnection of the first power supply (general-purpose power supply) 101, connection or disconnection of the second power supply (PSE power supply) 102, a state of the switch unit 109, a state of power feeding to the first load unit 107, and a state of power feeding to the second load unit 108. These units are illustrated in FIG. 2. Each arrow in FIG. 4 illustrates a condition for the state transition.

In step S201, the general-purpose power supply 101 and the PSE power supply 102 are both in an unconnected state of not being connected to the powered device 100. The switch unit 109 is in the indefinite state. The first load unit 107 and the second load unit 108 are in a state of not being fed.

If the general-purpose power supply 101 is connected to the powered device 100 in the state in step S201, a transition to a state in step S202 occurs. When the transition to the state in step S202 occurs, the general-purpose power supply 101 changes to a connected state. In the state in step S202, power supply (power feeding from the power supply) from the general-purpose power supply 101 to the first load unit 107 is performed, and power supply from the general-purpose power supply 101 to the second load unit 108 is performed. In this case, the switch unit 109 is in the open state.

If the general-purpose power supply 101 is disconnected from the powered device 100, a transition from the state in step S202 to the state in step S201 occurs.

In a case where the PSE power supply 102 is connected to the powered device 100 in the state in step S201, a transition to a state in step S203 occurs. When the transition to the state in step S203 occurs, the PSE power supply 102 changes to the connected state. In the state in step S203, power supply from the PSE power supply 102 to the first load unit 107 is performed, and power supply from the PSE power supply 102 to the second load unit 108 is performed. In this case, the switch unit 109 is in the short circuit state.

If the PSE power supply 102 is disconnected from the powered device 100, a transition from the state in step S203 to the state in step S201 occurs.

In a case where the general-purpose power supply 101 is connected to the powered device 100 in the state in step S203, a transition to a state in step S204 occurs. When the transition to the state in step S204 occurs, the general-purpose power supply 101 changes to the connected state. In the state in step S204, the power supply from the PSE power supply 102 to the first load unit 107 is performed, and the power supply from the general-purpose power supply 101 to the second load unit 108 is performed. In this case, the switch unit 109 is in the open state.

If the general-purpose power supply 101 is disconnected from the powered device 100, a transition from the state in step S204 to the state in step S203 occurs.

In a case where the PSE power supply 102 is connected to the powered device 100 in the state in step S202, a transition to the state in step S204 occurs. When the transition to the state in step S204 occurs, the PSE power supply 102 changes to the connected state. In the state in step S204, as described above, the power supply from the PSE power supply 102 to the first load unit 107 is performed, and the power supply from the general-purpose power supply 101 to the second load unit 108 is performed. The switch unit 109 is in the open state.

In the case where the transition from the state in step S202 to the state in step S204 occurs, it is necessary for the PSE power supply 102 to operate within a limit value of 400 mA (12.95 W) immediately after the PSE power supply 102 changes to the connection state (until completion of a negotiation). This is because when an electric current exceeding 400 mA flows, power supply from the PSE power supply 102 to the powered device 100 stops due to an overcurrent prevention function of the PSE power supply 102.

In the present exemplary embodiment, there is provided the configuration in which the load on the general-purpose power supply 101 (second load unit: the power consumption of 10 W) and the load on the PSE power supply 102 (first load unit: the power consumption of 7 W) are electrically separated. Thus, even if the load on the entire powered device 100 is 17 W (12.95 W or more), the load on the PSE power supply 102 is only 7 W, which is the load on the first load unit 107 (12.95 W or less). Since 7 W<12.95 W, the electric current flowing from the PSE power supply 102 to the first load unit 107 immediately after the PSE power supply 102 changes to the connected state does not exceed the limit value of 400 mA (12.95 W). In this way, in the present exemplary embodiment, the power supply from the PSE power supply 102 to the powered device 100 does not stop immediately after the PSE power supply 102 changes to the connected state. In other words, it is possible to inhibit (prevent) an overcurrent from flowing into the first load unit 107 of the powered device 100 immediately after a change in the power supply and to inhibit (prevent) power feeding from being stopped.

If the PSE power supply 102 is disconnected from the powered device 100, a transition from the state in step S204 to the state in step S202 occurs.

(Power Supply State in Step S202)

Figure 5:
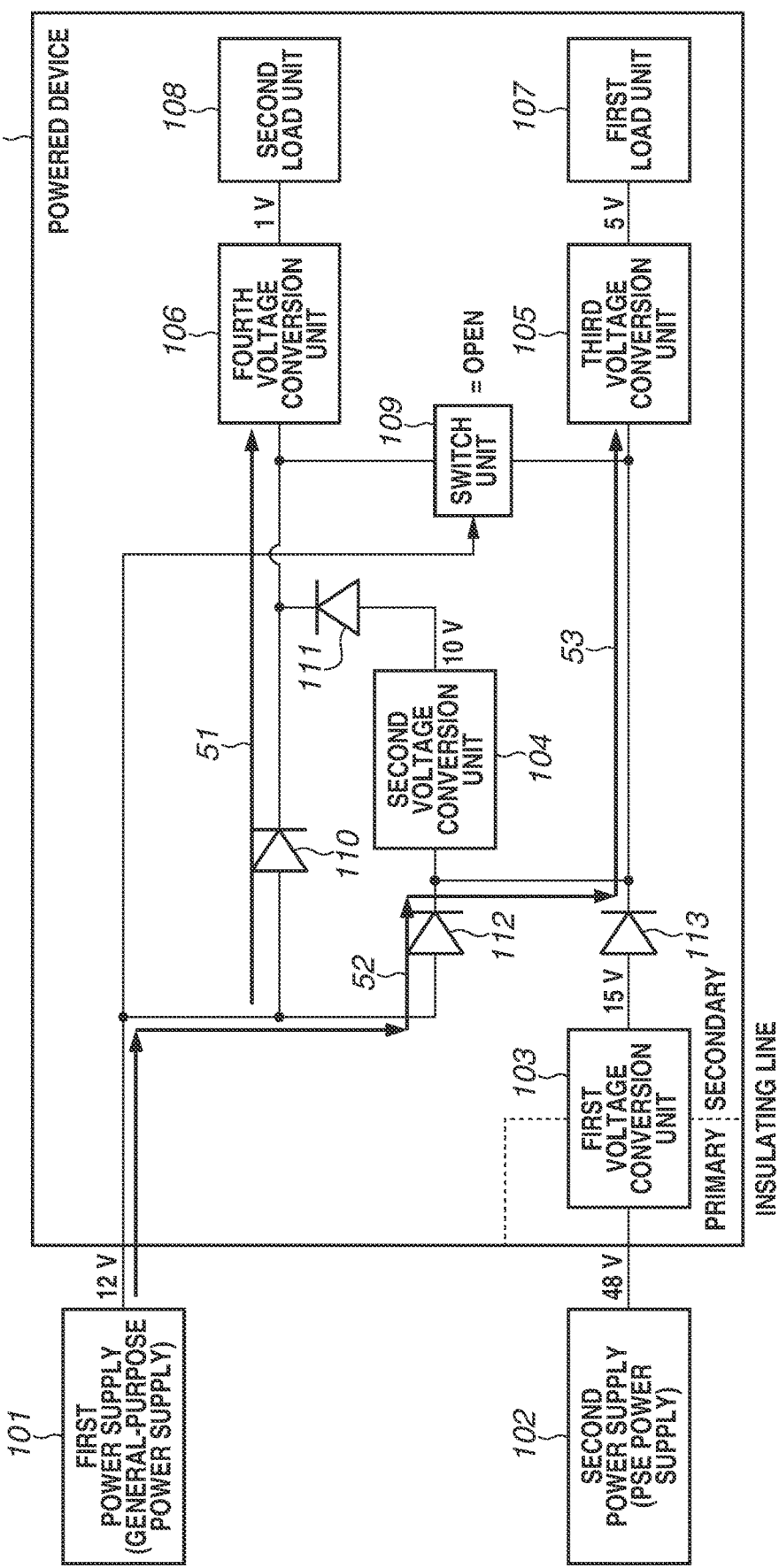
FIG. 5 is a diagram illustrating a power supply state where only a general-purpose power supply is connected according to one embodiment.

FIG. 5 illustrates the power supply state where the power is supplied to the first load unit 107 and the second load unit 108 in the state in step S202 (state where only the general-purpose power supply 101 is connected).

The voltage (12 V) of the general-purpose power supply 101 is input to the fourth voltage conversion unit 106 through the backflow prevention diode 110, as indicated with an arrow 51. The voltage (12 V) is converted into 1 V by the fourth voltage conversion unit 106, and the converted voltage is supplied from the fourth voltage conversion unit 106 to the second load unit 108.

Further, the voltage (12 V) of the general-purpose power supply 101 is input to the second voltage conversion unit 104 and the third voltage conversion unit 105 through the backflow prevention diode 112, as indicated with an arrow 52 and an arrow 53. In the present exemplary embodiment, the output voltage (10 V) of the second voltage conversion unit 104 is not input to the fourth voltage conversion unit 106 due to the backflow prevention diode 111. The voltage (12 V) of the general-purpose power supply 101 is converted into 5 V by the third voltage conversion unit 105, and the converted voltage is supplied from the third voltage conversion unit 105 to the first load unit 107.

(Power Supply State in Step S203)

Figure 6:
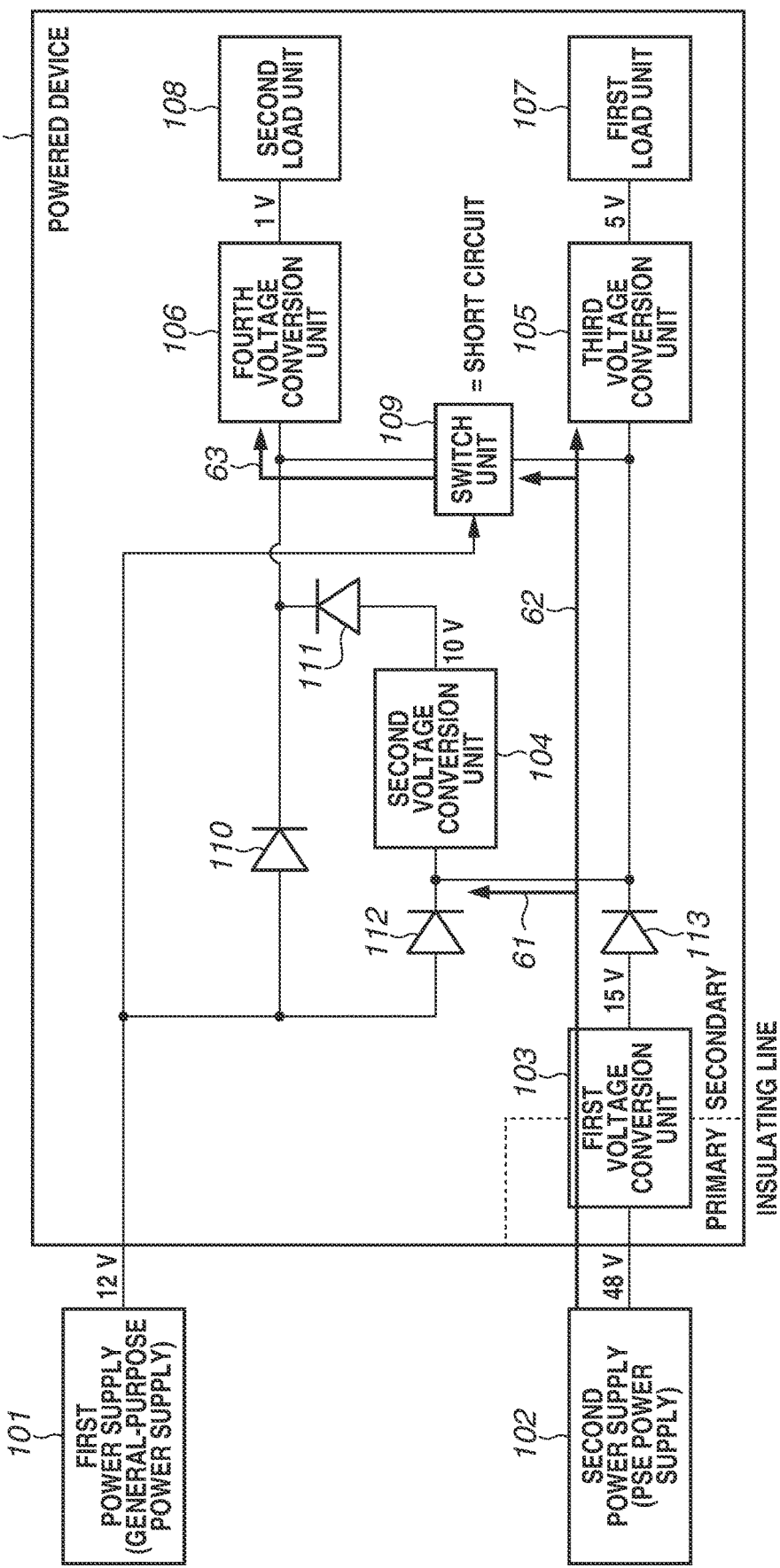
FIG. 6 is a diagram illustrating a power supply state where only a power sourcing equipment (PSE) power supply is connected according to one embodiment.

FIG. 6 illustrates the power supply state where the power is supplied to the first load unit 107 and the second load unit 108 in the state in step S203 (state where only the PSE power supply 102 is connected).

The voltage (48 V) of the PSE power supply 102 is input to the first voltage conversion unit 103. The voltage (48 V) is converted into 15 V by the first voltage conversion unit 103. The output voltage (15 V) of the first voltage conversion unit 103 is input to the second voltage conversion unit 104 and the third voltage conversion unit 105 through the backflow prevention diode 113, as indicated with an arrow 61 and an arrow 62. In the present exemplary embodiment, the output voltage of the second voltage conversion unit 104 is not input to the fourth voltage conversion unit 106 due to the backflow prevention diode 111. The voltage (15 V) input from the first voltage conversion unit 103 to the third voltage conversion unit 105 is converted into 5 V by the third voltage conversion unit 105. Then, the output voltage of the third voltage conversion unit 105 is supplied to the first load unit 107. Further, because the switch unit 109 is in the short circuit state, the output voltage (15 V) of the first voltage conversion unit 103 is input to the fourth voltage conversion unit 106 through the switch unit 109, as indicated with an arrow 63. The voltage is converted into 1 V by the fourth voltage conversion unit 106, and the converted voltage is supplied from the fourth voltage conversion unit 106 to the second load unit 108.

(Power Supply State in Step S204)

Figure 7:
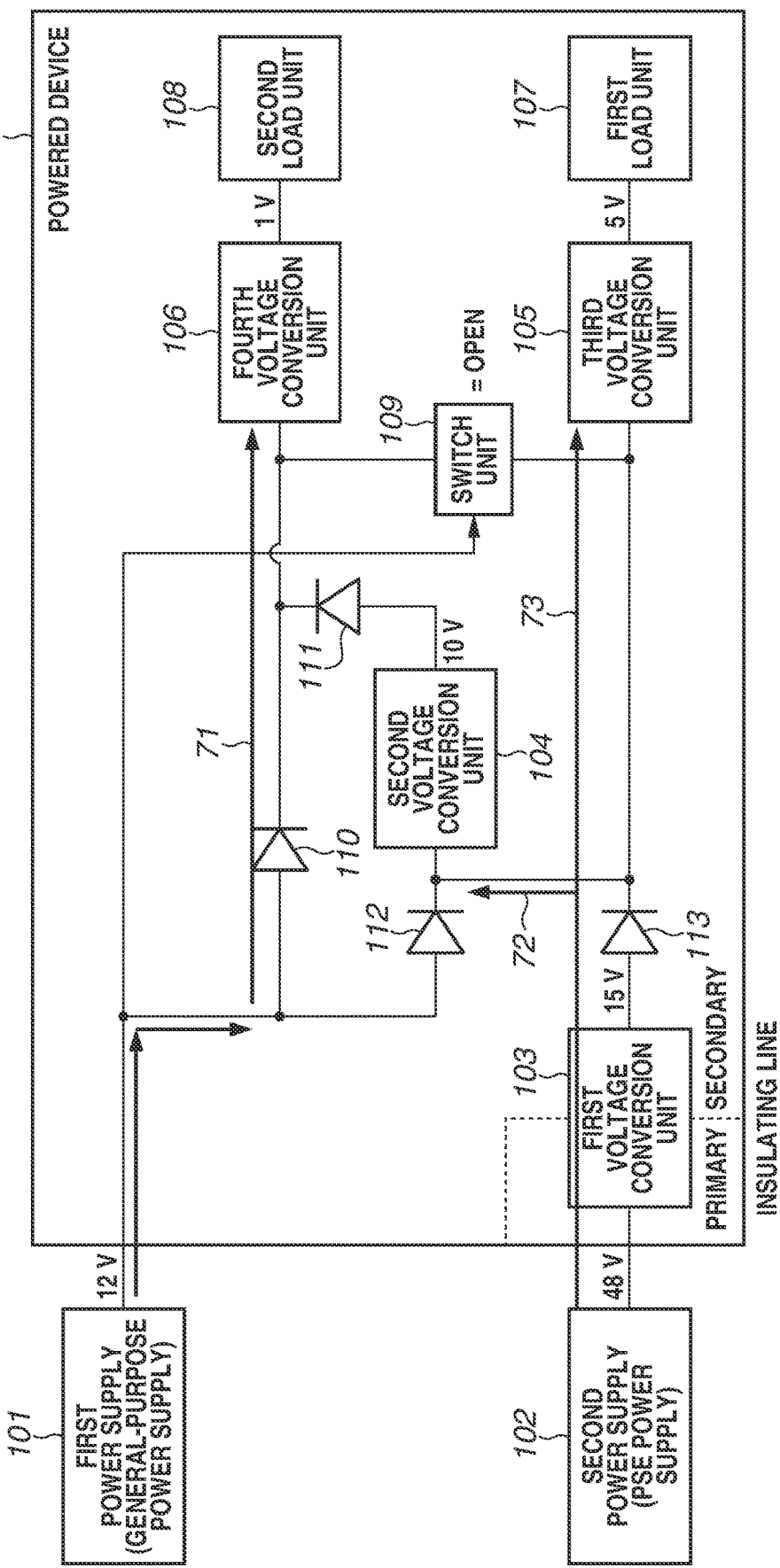
FIG. 7 is a diagram illustrating a power supply state where the general-purpose power supply and the PSE power supply are connected according to one embodiment.

FIG. 7 illustrates the power supply state where the power is supplied to the first load unit 107 and the second load unit 108 in the state in step S204 (state where the general-purpose power supply 101 and the PSE power supply 102 are connected).

The voltage (12 V) of the general-purpose power supply 101 is input to the fourth voltage conversion unit 106 through the backflow prevention diode 110, as indicated with an arrow 71. The voltage is converted into 1 V by the fourth voltage conversion unit 106, and the converted voltage is supplied from the fourth voltage conversion unit 106 to the second load unit 108.

The voltage (48 V) of the PSE power supply 102 is input to the first voltage conversion unit 103. The voltage is converted into 15 V by the first voltage conversion unit 103. The output voltage (15 V) of the first voltage conversion unit 103 is input to the second voltage conversion unit 104 and the third voltage conversion unit 105 through the backflow prevention diode 113 (an arrow 72 and an arrow 73). In the present exemplary embodiment, the output voltage of the second voltage conversion unit 104 is not input to the fourth voltage conversion unit 106 due to the backflow prevention diode 111. The voltage (15 V) input from the first voltage conversion unit 103 to the third voltage conversion unit 105 is converted into 5 V by the third voltage conversion unit 105, and the converted voltage is supplied from the third voltage conversion unit 105 to the first load unit 107.

The components of the powered device 100 other than the first load unit 107 and the second load unit 108 change the way of supplying the power (change a power supply route) to the first load unit 107 and the second load unit 108, and thus may be collectively referred to as a changing unit.

(Hardware Configuration of Powered Device)

Figure 8A:
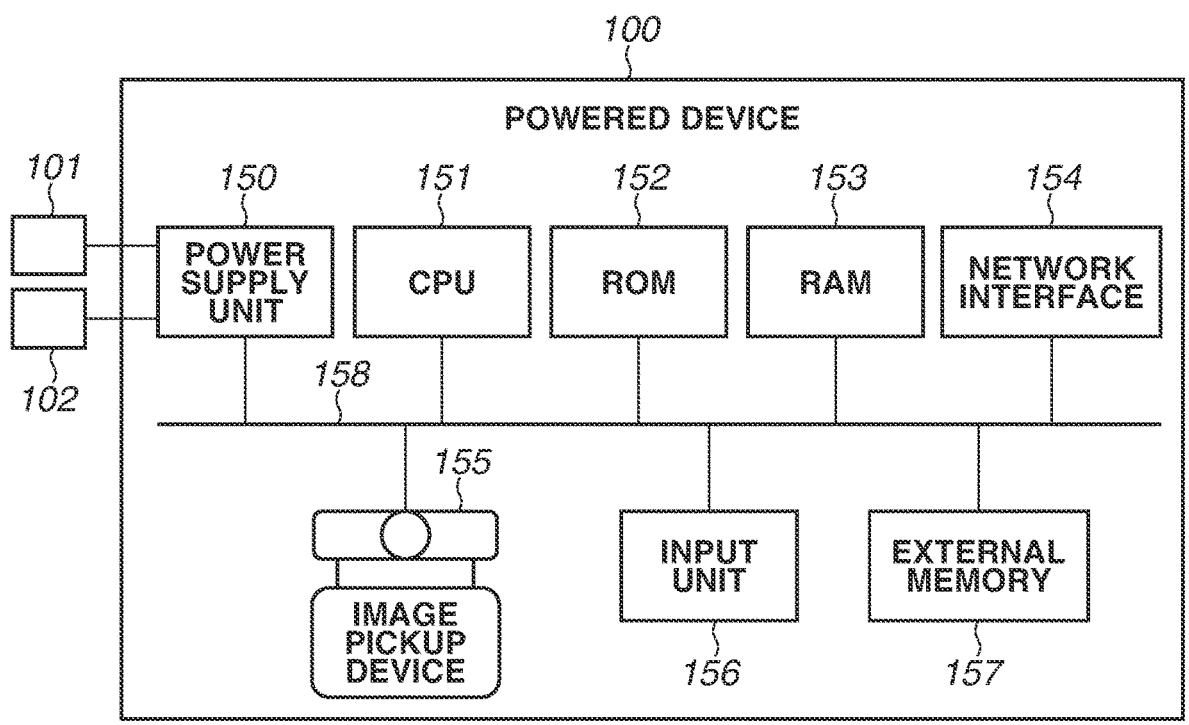
FIGS. 8A and 8B are block diagrams each illustrating a hardware configuration of the powered device and a hardware configuration of a client apparatus, respectively according to one embodiment.

FIG. 8A is a block diagram illustrating an example of a hardware configuration of the powered device 100.

The powered device 100 has a power supply unit 150, a central processing unit (CPU) 151, a read only memory (ROM) 152, a random access memory (RAM) 153, a network interface 154, an image pickup device 155, an input unit 156, and an external memory 157.

The power supply unit 150 is connected to the general-purpose power supply 101 and the PSE power supply 102. The power supply unit 150 is a portion constituted of the components of the powered device 100 other than the first load unit 107 and the second load unit 108 in FIG. 2 (i.e., the first voltage conversion unit 103 to the fourth voltage conversion unit 106, and the switch unit 109 to the backflow prevention diode 113).

The CPU 151 is a controller that controls the powered device 100. The CPU 151 controls each of the components (the ROM 152 to the external memory 157) of the powered device 100.

The ROM 152 stores a program necessary for the CPU 151 to execute processing. The CPU 151 executes the processing based on the program stored in the ROM 152, so that control of the image pickup device 155 is implemented. The program may be stored in the external memory 157 or a removable storage medium (not illustrated).

The RAM 153 is a memory into which the CPU 151 loads the program read out from the ROM 152 to execute the processing. The RAM 153 is also used as a storage area for temporarily storing data to be subjected to various kinds of processing, i.e., as a temporary storage memory.

The network interface 154 is a circuit used to perform communication with an apparatus such as the client apparatus 300 (FIG. 1). For example, the network interface 154 is used when a captured image and notice information are transmitted to the client apparatus 300. The network interface 154 is, for example, a wireless LAN interface.

The image pickup device 155 is a device including an image sensor that captures a moving image and a still image of an object. The image pickup device 155 can adjust image capturing conditions such as an angle of view and an image-capturing direction. The image pickup device 155 includes an image processing IC. Further, the image pickup device 155 has a lens motor and a pan-tilt-zoom mechanism, and executes panning, tilting, and zooming (telephoto/wide-angle control) operation based on control by the CPU 151. The image pickup device 155 includes an optical system member such as a lens, and a complementary metal oxide semiconductor (CMOS) image sensor or a charge coupled device (CCD) image sensor to perform image capturing of an object and to obtain a video image.

The input unit 156 includes a power supply button and a numeric keypad. A user of the system 400 can provide an instruction to the powered device 100 via the input unit 156.

The external memory 157 stores, for example, various kinds of data and information that are necessary when the CPU 151 executes the processing using the program. The external memory 157 also stores various kinds of data and information obtained by the CPU 151 executing the processing using the program.

The components (the power supply unit 150 to the external memory 157) of the powered device 100 are interconnected with a bus 158. The powered device 100 may include an output unit that outputs sound and an image.

Which component belongs to the first load unit 107 and which component belongs to the second load unit 108, among the components of the powered device 100 in FIG. 8A, are determined in consideration of power consumption of each of the components. The power is supplied from the power supply unit 150 to the first load unit 107 and the second load unit 108, so that the bus 158 includes a plurality of power supply lines.

Figure 8B:
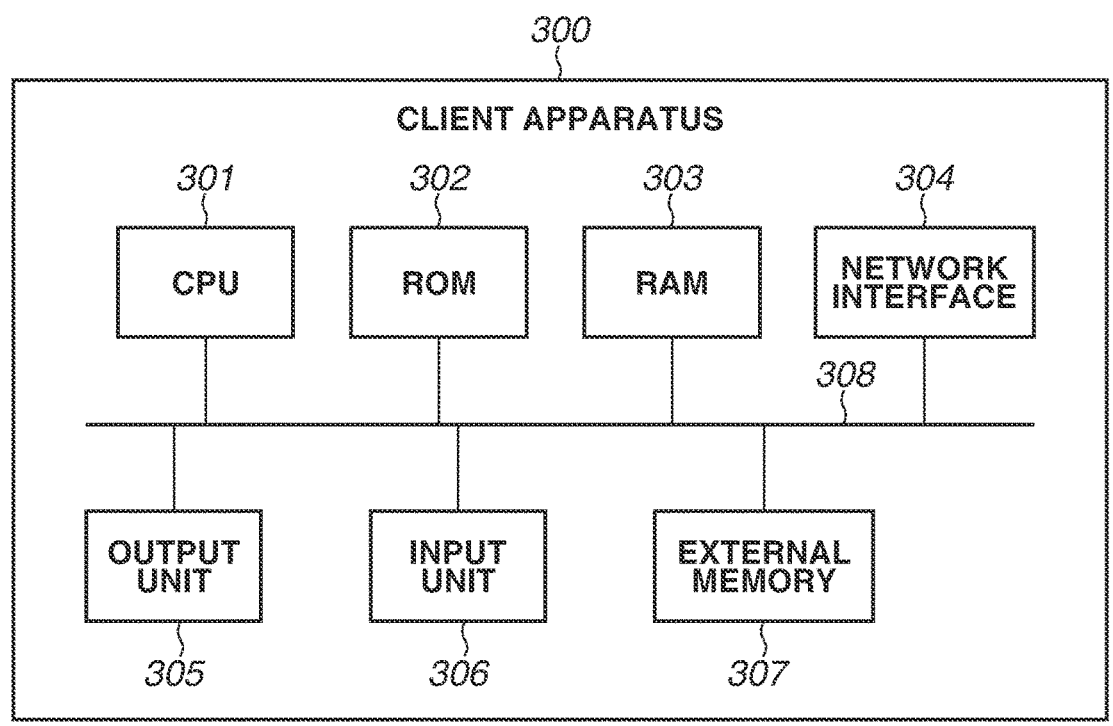

FIG. 8B is a block diagram illustrating an example of a hardware configuration of the client apparatus 300.

The client apparatus 300 has a CPU 301, a ROM 302, a RAM 303, a network interface 304, an output unit 305, an input unit 306, and an external memory 307.

The CPU 301 controls the client apparatus 300. The CPU 301 controls each of the components (the ROM 302 to the external memory 307) of the client apparatus 300.

The ROM 302 stores a program necessary for the CPU 301 to execute processing. The CPU 301 may execute the processing based on the program stored in the ROM 302, so that control of the output unit 305 of the client apparatus 300 may be implemented. The program may be stored in the external memory 307 or a removable storage medium (not illustrated).

The RAM 303 is a memory into which the CPU 301 loads the program read out from the ROM 302 to execute the processing. The RAM 303 is also used as a storage area for temporarily storing data to be subjected to various kinds of processing, i.e., as a temporary storage memory.

The network interface 304 is a circuit used for performing communication with the powered device 100 via the network 200. For example, the network interface 304 is used when an image capturing instruction is transmitted to the powered device 100. The network interface 304 is, for example, a wireless LAN interface.

The output unit 305 includes an image display unit and an audio output unit. The output unit 305 can display a moving image and a still image, and can output sound (including an alarm). The image display unit may also function as a user interface (input unit 306) by being used as a touch panel. The input unit 306 includes a keyboard, a switch, a power supply button, and a numeric keypad. The user can provide an instruction to the client apparatus 300 or the powered device 100 via the input unit 306.

The external memory 307 stores, for example, various kinds of data and information that are necessary when the CPU 301 executes the processing using the program. The external memory 307 also stores various kinds of data and information obtained by the CPU 301 executing the processing using the program.

The components (the CPU 301 to the external memory 307) of the client apparatus 300 are interconnected with a bus 308.

(Effects of Exemplary Embodiment)

In the present exemplary embodiment, in the state where the power supply from the general-purpose power supply 101 is performed (step S202), if the PSE power supply 102 is connected to the powered device 100 (step S204), each of the general-purpose power supply 101 and the PSE power supply 102 supplies the power to the powered device 100. More specifically, the general-purpose power supply 101 supplies the power to the second load unit 108, and the PSE power supply 102 supplies the power to the first load unit 107. Thus, even if the PSE power supply 102 is connected while the power is being supplied from the general-purpose power supply 101, an overcurrent does not flow from the PSE power supply 102 to the powered device 100. Hence, a power feeding stop state of the powered device 100 does not occur. The powered device 100 can stop if the power supply from the PSE power supply 102 to the powered device 100 stops. In a case where the powered device 100 is a monitoring camera, if the powered device 100 stops, monitoring using the monitoring camera cannot be performed until execution of a reset and a reboot. In the present exemplary embodiment, because the powered device 100 does not stop, the monitoring using the monitoring camera is continuously performed, and monitoring on the client apparatus 300 can also be continuously performed. In this way, according to the present exemplary embodiment, stability of operation involving a change in the power supply can be improved in the powered device 100 that receives the power from the plurality of power supplies (the first power supply 101 and the second power supply 102).

In the present exemplary embodiment, in a case where the general-purpose power supply 101 and the PSE power supply 102 are connected to the powered device 100, each of the general-purpose power supply 101 and the PSE power supply 102 supplies the power to the powered device 100. In other words, since the power is not supplied only from the PSE power supply 102 but also from the general-purpose power supply 101 with a high degree of power supply efficiency, the power supply efficiency in the case where the two power supplies 101 and 102 are used can be improved. An improvement in the power supply efficiency can inhibit heat generation by the powered device 100 and can contribute to a reduction in size of the powered device 100.

(Modifications)

While an exemplary embodiment of the present disclosure has been described above, the present disclosure is not limited to the above-described exemplary embodiment, and various modifications can be made within the scope of the present disclosure.

In the above-described exemplary embodiment, the monitoring camera is used as an example of the powered device 100. However, the powered device 100 may also be a device other than the monitoring camera. For example, the powered device 100 may be a device such as a communication device.

The output voltage (48 V) of the PSE power supply 102, and the output voltages (15 V 10 V, 5 V, and 1 V) of the first voltage conversion unit 103 to the fourth voltage conversion unit 106 are merely examples, and each of the output voltages may also be a voltage having a value other than the value specified herein. The voltage values may be changed as appropriate depending on, for example, the components of the powered device 100.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167833, filed Sep. 7, 2018, which is hereby incorporated by reference herein in its entirety.

What is claimed is:

1. A powered device that receives power from at least one of a first power supply and a second power supply having a voltage higher than a voltage of the first power supply, the powered device comprising:
   a first load unit;
   a second load unit electrically separated from the first load unit; and
   a changing unit configured to
   supply power from the first power supply to the first load unit and the second load unit in a case where the first power supply is connected to the powered device and the second power supply is not connected to the powered device, and
   supply power from the second power supply to the first load unit and from the first power supply to the second load unit in a case where the first power supply and the second power supply are connected to the powered device,
   wherein the changing unit includes a first voltage conversion unit that converts the voltage of the second power supply to a voltage higher than the voltage of the first power supply.

2. The powered device according to claim 1, wherein the changing unit supplies power from the second power supply to the first load unit and to the second load unit in a case where the first power supply is not connected to the powered device and the second power supply is connected to the powered device.

3. The powered device according to claim 1, wherein the second power supply is power sourcing equipment (PSE) in conformity with Institute of Electrical and Electronics Engineers (IEEE) 802.3at.

4. The powered device according to claim 1, wherein the changing unit further includes a second voltage conversion unit that converts an output voltage of the first voltage conversion unit or the voltage of the first power supply to a voltage lower than the voltage of the first power supply.

5. The powered device according to claim 4,
   wherein the changing unit further includes:
   a third voltage conversion unit that is connected to the first voltage conversion unit and the first power supply and converts the output voltage of the first voltage conversion unit or the voltage of the first power supply to a voltage higher than or equal to a voltage necessary for the first load unit; and
   a fourth voltage conversion unit that is connected to the first voltage conversion unit and the first power supply and converts the output voltage of the first voltage conversion unit or the voltage of the first power supply to a voltage higher than or equal to a voltage necessary for the second load unit,
   wherein the first load unit is supplied with power by the third voltage conversion unit, and
   wherein the second load unit is supplied with power by the fourth voltage conversion unit.

6. The powered device according to claim 5,
   wherein the changing unit further includes a switch unit that is connected to an input unit of the third voltage conversion unit and an input unit of the fourth voltage conversion unit, and
   wherein the switch unit is in an open state in a case where the first power supply is connected, and the switch unit is in a short circuit state in a case where the first power supply is not connected.

7. The powered device according to claim 1, wherein maximum power necessary to drive the first load unit is 12.95 W or less.

8. The powered device according to claim 1, wherein maximum power necessary to drive the first load unit is smaller than maximum power necessary to drive the second load unit.

9. The powered device according to claim 1,
   wherein the powered device is a camera,
   wherein the first load unit includes an image sensor and a lens motor of the camera, and
   wherein the second load unit includes an image processing integrated circuit of the camera.

10. A method of changing power supply for a powered device that receives power from at least one of a first power supply and a second power supply having a voltage higher than a voltage of the first power supply, the powered device including a first load unit, a second load unit, and a changing unit, the method comprising:
   causing the changing unit to supply power from the first power supply to the first load unit and the second load unit in a case where the first power supply is connected to the powered device and the second power supply is not connected to the powered device; and causing the changing unit to supply power from the second power supply to the first load unit and from the first power supply to the second load unit in a case where the first power supply and the second power supply are connected to the powered device, wherein the changing unit includes a first voltage conversion unit that converts the voltage of the second power supply to a voltage higher than the voltage of the first power supply.

\* \* \* \* \*